(12) United States Patent
Susaki et al.

(10) Patent No.: US 8,742,393 B2
(45) Date of Patent: Jun. 3, 2014

(54) ELECTRON EMITTING SOURCE AND SUBSTRATE FOR THIN FILM GROWTH

(75) Inventors: Tomofumi Susaki, Tokyo (JP); Hideo Hosono, Tokyo (JP)

(73) Assignee: Tokyo Institute of Technology (JP)

( * ) Notice: Subject to any disclaimer, the term of this patent is extended or adjusted under 35 U.S.C. 154(b) by 0 days.

(21) Appl. No.: 13/415,039

(22) Filed: Mar. 8, 2012

(65) Prior Publication Data

US 2013/0032778 A1   Feb. 7, 2013

(30) Foreign Application Priority Data

Aug. 5, 2011   (JP) .................................. 2011-172319

(51) Int. Cl.
*H01L 29/06*   (2006.01)
(52) U.S. Cl.
USPC .......... 257/10; 257/295; 257/E29.068; 438/3; 438/693.1; 365/145
(58) Field of Classification Search
USPC ......... 257/10, 295, E29.068, E27.104; 438/3, 438/693.1; 365/145
See application file for complete search history.

(56) References Cited

U.S. PATENT DOCUMENTS

2010/0110754 A1*   5/2010   Hu et al. ....................... 365/145

OTHER PUBLICATIONS

Jacek Goniakowski, and Claudine Noguera. "Electric States and Schottky Barrier Height at Metal/MgO (100) Interface." Interface Science: 2004: Issue 12: pp. 93-103.
A. Ohtomo, and H. Y. Hwang. "A high-mobility electron gas at the LaAlO3/SrTiO3 heterointerface." Nature Jan. 29, 2004: Issue 427: pp. 423-426.

* cited by examiner

*Primary Examiner* — Mark A Laurenzi
(74) *Attorney, Agent, or Firm* — Cantor Colburn LLP

(57) ABSTRACT

The $SrTiO_3$ buffer layer is formed by lamination of the $Sr^{2+}O^{2-}$ layer and the $Ti^{4+}O_2^{4-}$ layer. The surface of the buffer layer is terminated with the $Ti^{4+}O_2^{4-}$ layer. On the buffer layer, a $LaAlO_3$ thin film layer is formed. The thin film layer includes a $La^{3+}O^{2-}$ layer and an $Al^{3+}O_2^{4-}$ layer alternately laminated in order on the $SrTiO_3$ buffer layer.

7 Claims, 2 Drawing Sheets

1a

ELECTRON EMITTING SOURCE AND SUBSTRATE FOR THIN FILM GROWTH

BACKGROUND OF THE INVENTION

1. Field of the Invention

The present invention relates to electron-emitting sources.

2. Description of the Related Art

An electron-emitting source that emits thermal electrons or field electrons is used as an electron beam source, discharge tube, or the like. In order to derive a large amount of high-energy electrons from low energy input, the electron-emitting source should be composed of materials that exhibit a low work function.

It has long been known that alkali metals, alkali earth metals, and the compounds thereof exhibit low work functions. These substances, however, have the disadvantage that they are very chemically active, and, for example, react with trace amounts of water in the atmosphere to change their characteristics. At present, $LaB_6$ is put into practical use as a material for electron guns. $LaB_6$ exhibits a work function of 2.66 to 3.55 eV, whose values must be further lowered in order to obtain higher performance. It is reported that when, for example, $LaB_6$ is coated with BaO, an alkaline-earth metal oxide, the work function will be lowered into a range of 2.27 to 2.07 eV.

RELATED ART LITERATURE

Non-Patent Literature

[Non-patent Literature 1] A. Ohtomo, and H. Y. Hwang. "A high-mobility electron gas at the LaAlO3/SrTiO3 hetero-interface." Nature 29 Jan. 2004: Issue 427: pp. 423-426

[Non-patent Literature 2] Jacek Goniakowski, and Claudine Noguera. "Electric States and Schottky Barrier Height at Metal/MgO (100) Interface." INTERFACE SCIENCE: 2004: Issue 12: pp. 93-103

SUMMARY OF THE INVENTION

The present invention was made in light of the aforementioned issues. One of the exemplary purposes of the embodiment is to provide a chemically stable electron-emitting source with a low work function.

An embodiment of the present invention relates to an electron-emitting source. The electron-emitting source includes: a $SrTiO_3$ buffer layer that includes a laminate of $Sr^{2+}O^{2-}$ and $Ti^{4+}O_2^{4-}$ and has a surface terminated with $Ti^{4+}O_2^{4-}$; and a $LaAlO_3$ thin film layer that includes $La^{3+}O^{2-}$ and $Al^{3+}O_2^{4-}$ layers alternately placed in order on the previous $SrTiO_3$ buffer layer.

This embodiment provides a low work function according to the thickness of the $LaAlO_3$ thin film layer. This electron-emitting source is also very chemically stable.

The $SrTiO_3$ buffer layer may include a conductive first layer of $SrTiO_3$ and an insulating second layer of undoped $SrTiO_3$ formed on the first layer. In this case, the electric charge from the first layer may be supplied to the interface between the buffer layer and thin film layer by way of the second layer.

The first layer of $SrTiO_3$ may be doped with Nb or La or may use oxygen defects. This allows $SrTiO_3$ to provide conductivity.

The second layer may have a thickness of about twenty (20) unit cells.

One embodiment of the electron-emitting source may additionally include an electrode connected to the interface between the $SrTiO_3$ buffer layer and the $LaAlO_3$ thin film layer. This allows an ohmic electrode to be formed by letting aluminum or a similar metal contact the interface between $SrTiO_3$ and $LaAlO_3$. It can thus supply electrons to the interface.

The thickness of the $LaAlO_3$ thin film layer may be between four (4) and twenty (20) unit cells inclusive.

When the thickness exceeds four unit cells, the work function first sharply decreases and subsequently changes gradually. Thus, a target low work function can be obtained according to the thickness.

The thickness of the $LaAlO_3$ thin film layer may be varied in planar directions. This allows for electrons to be emitted in various embodiments by distributing work functions over the plane of the electron-emitting source.

Another embodiment of the present invention relates to a substrate for thin-film growth. The substrate for thin-film growth includes a $SrTiO_3$ buffer layer that includes a laminate of $Sr^{2+}O^{2-}$ and $Ti^{4+}O_2^{4-}$ and has a surface terminated with $Ti^{4+}O_2^{4-}$; and a $LaAlO_3$ thin film layer that includes $La^{3+}O^{2-}$ and $Al^{3+}O_2^{4-}$ layers alternately applied in order on the $SrTiO_3$ buffer layer. This allows a thin film to form on the $LaAlO_3$ thin film layer through CVD (chemical vapor deposition).

The substrate for thin-film growth exhibits a low work function that can be controlled according to the thickness of the $LaAlO_3$ thin film layer. For this reason, the growth may be enhanced by giving the appropriate optimal work function for the material to be accumulated.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments, which do not intend to limit the scope of the present invention but exemplify the invention. All of the features and the combinations thereof described in the embodiment are not necessarily essential to the invention.

Figure 1:
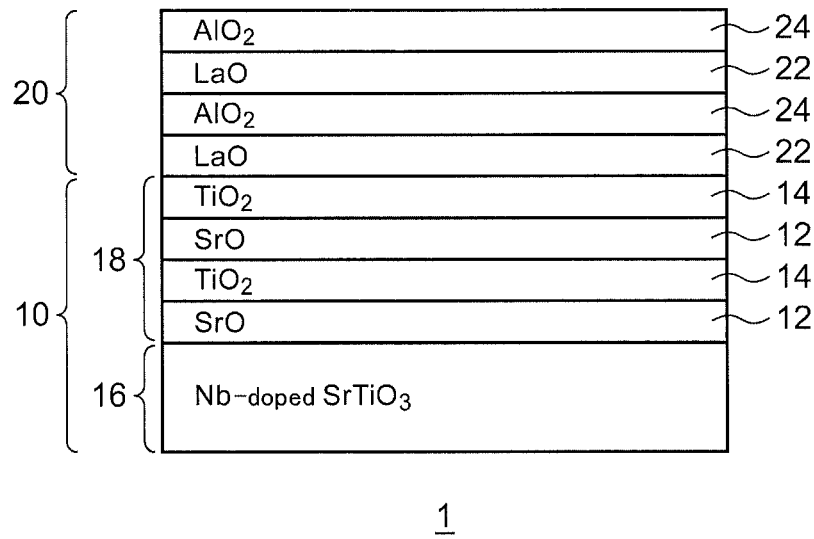
FIG. 1 shows a section view that indicates the structure of the electron-emitting source associated with an embodiment.

FIG. 1 is a section view showing the structure of the electron-emitting source associated with the embodiments. It shows simplified thicknesses and numbers of layers.

The electron-emitting source 1 includes a $SrTiO_3$ (strontium titanate) buffer layer 10 (hereafter, also simply referred to as the buffer layer) and a $LaAlO_3$ (Lanthanum aluinate)

thin film layer 20 (hereafter, also simply referred to the thin film layers). The buffer layer 10 is formed as electrically neutral, alternately laminated $Sr^{2+}O^{2-}$ and $Ti^{4+}O_2^{4-}$ layers. The surface of the buffer layer 10 is terminated with $Ti^{4+}O_2^{4-}$.

The thin film layer 20 is formed on the buffer layer 10. It includes a $La^{3+}O^{2-}$ layer 22 and an $Al^{3+}O_2^{4-}$ layer 24 alternately laminated on the $SrTiO_3$ buffer layer.

The $SrTiO_3$ buffer layer 10 may preferably include a first layer 16 of $SrTiO_3$ doped with Nb and a second layer 18 of undoped $SrTiO_3$ formed on the first layer 16.

Thus far, the structure of the electron-emitting source 1 has been described.

Next, the method for manufacturing the electron-emitting source 1 is described.

1. Formation of the First Layer 16 of the Buffer Layer 10

The surface of a $SrTiO_3$ substrate (100) doped with 0.5%-by-weight Nb is mechanically polished and then etched with a $NH_4F$—HF solution to provide a $TiO_2$-terminated surface that is flat on the atomic scale. This substrate is introduced into a vacuum chamber and annealed for one hour at 900° C. in an atmosphere at an oxygen partial pressure of $1\times10^{-3}$ Pa to produce a clean flat surface. The substrate was confirmed with an atom force microscope to be clean and flat. To make the first layer 16 conductive, the substrate may be doped with La instead of Nb or may use oxygen defects.

2. Formation of the Second Layer 18 of the Buffer Layer 10

On this substrate, an undoped $SrTiO_3$ (100) thin film layer with a thickness of 20 unit cells was deposited at a substrate temperature of 700° C. and an oxygen partial pressure of $1\times10^{-4}$ Pa. This undoped layer must be made to be an insulator. In order to destroy the oxygen defects, which create a residual conductivity, the undoped layer was annealed for one hour with a substrate temperature of 700° C. at an oxygen partial pressure of $1\times10^1$ Pa until it became insulating. The adequacy of these conditions for making the layer insulating was verified by demonstrating that performing the same thin-film growth and annealing on the undoped substrate provides the same insulation performance as for the original undoped substrate.

3. Formation of the Thin film Layer 20

On the undoped $SrTiO_3$ (100) thin film layer thus produced, a thin film of $LaAlO_3$ was deposited little by little with a substrate temperature of 600° C. and an oxygen partial pressure of $1\times10^{-4}$ Pa. The thin-film growth was performed using the pulsed laser ablation method based on KrF excimer lasers (Lambda Physik COMPexPro 201), with a laser irradiation energy of approximately 30 mJ for $SrTiO_3$ and approximately 45 mJ for $LaAlO_3$. Pulse lasers radiated at a frequency of 1 Hz. As an alternate accumulation method, the molecular beam epitaxy method may be used in place of the pulsed laser ablation method.

Thus far, both the structure and the method for manufacturing the electron-emitting source 1 have been described. Next, the characteristics of the electron-emitting source 1 manufactured in this manufacturing method are described.

Figure 2:
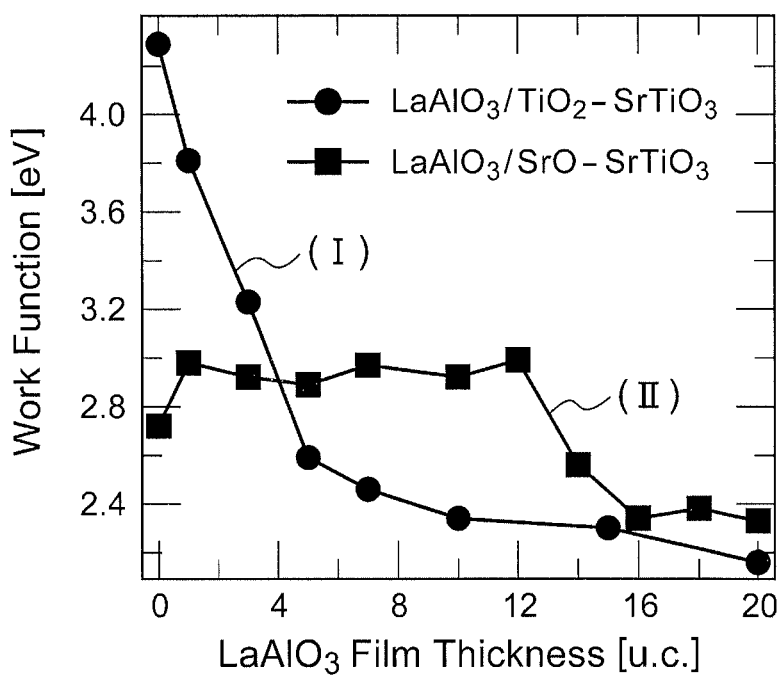
FIG. 2 shows the relationship between the thickness of the $LaAlO_3$ thin film layer and the work function of the surface of the electron-emitting source.

FIG. 2 shows the relationship between the thickness of the $LaAlO_3$ thin film layer 20 and the work function of the surface of the electron-emitting source 1. The lateral and vertical axes indicate the thickness (unit cells) of the thin film layer 20 and the measured work functions (eV), respectively. The work functions were measured with a Kelvin probe (from KP Technology) without exposing $LaAlO_3$ to the atmosphere while accumulating. The head of the probe used is a 4 mm stainless steel disc.

FIG. 2 shows the work function (I) of the structure in FIG. 1 having the $SrTiO_3$ thin film layer 20 accumulated on the buffer layer 10 terminated with $TiO_2$ as well as the work function (II) of the structure having a $SrTiO_3$ thin film layer accumulated on the buffer layer 10 terminated with SrO for comparison.

As Characteristics (I) indicate, when $LaAlO_3$ with a thickness of about four unit cells is accumulated on the $TiO_2$-terminated surface of $SrTiO_3$, the work function first significantly lowers, and then subsequently decreases little by little according to the thickness of the thin film layer. Ultimately, when the thickness is 20 unit cells (approximately 7.6 nm), a very low work function of 2.2 eV is achieved.

On the other hand, as Characteristics (II) indicate, when $LaAlO_3$ is deposited on the SrO-terminated surface, the work function exhibits an interesting behavior. However, SrO is a very instable, low-work-function substance and therefore would be inappropriate for the electron-emitting source 1.

As seen from the above, the electron-emitting source 1 associated with the embodiment can control the work function according to the thickness of the thin film layer 20, providing a low work function across the range from 4 to 20 unit cells.

If a (neutral) thin film layer composed of electrically neutral, laminated layers and a thin film (polarization) layer composed of alternately laminated, positively and negatively charged layers are laminated on the atomic scale, then a highly concentrated electron gas is produced in a very small area near the interface. This phenomenon was discovered in 2004 and has been studied world-wide in consideration of using it in transistor applications.

With attention focused on the fact that such a highly concentrated electron gas exists in close proximity to the surface of the substance, the present invention includes the discovery that this gas produces a very low work function. The phenomenon does not occur on the surface of any general solid substance. This means that near the surface of a conductor, the electron concentration is lower than inside the substance because electrons seep out to the vacuum and that near the surface of a semiconductor, the electron concentration is, as expected, significantly lower than inside the substance due to a depleted layer produced near the surface.

Even if a concentrated electron gas is produced near the surface of a substance, it does not always mean that the substance exhibits a low work function; it is not generally considered that there is a correlation between the electron concentration and the work function. In other words, the fact that the structure in FIG. 1 exhibits a very low work function as of today is not common technological knowledge but was first discovered by the inventors of the present invention.

The structure in FIG. 1 is also very chemically stable. For these reasons, the electron-emitting source 1 in FIG. 1 provides a low work function as well as chemical stableness, which are both required for electron-emitting sources.

The fact that the electron-emitting source 1 exhibits a low work function means that it can emit thermal electrons at low temperatures or field electrons in low electric fields. In addition, it is chemically stable and therefore can be used to emit electrons not only into vacuum but also into non-vacuum. For example, it can be used as the negative pole for discharge tubes.

If the structure in FIG. 1 is used as the electron emitting material, i.e., the electron-emitting source 1, then the charge to be emitted must be supplied. The structure in FIG. 1 can be provided with conductivity by doping the first layer 16 of the buffer layer 10 with Nb. Then, on the first layer 16, the undoped second layer 18, which has been made to be insulating, is formed and the $LaAlO_3$ thin film layer 20 is allowed to grow thereon. This allows electrons to be supplied to the interface between $LaAlO_3$ and $SrTiO_3$ by way of the second layer 18 via the tunnel effect.

Figure 3:
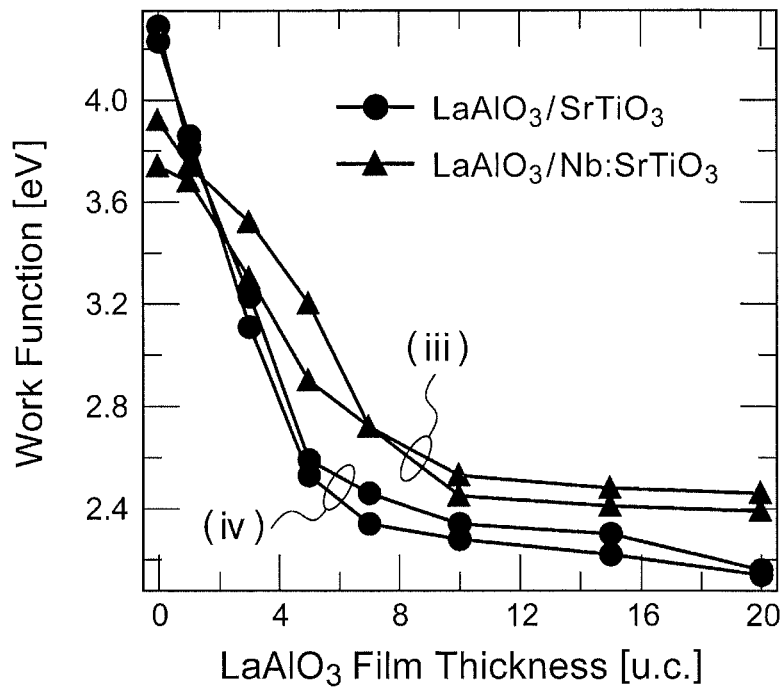
FIG. 3 shows the work function of the electron-emitting source in FIG. 1.

FIG. 3 shows the work function of the electron-emitting source 1 in FIG. 1. Elements (iii) and (iv) show the work function of the structure in FIG. 1 and the work function of the conductive first layer 16 with the thin film layer 20 directly accumulated on it, respectively. As FIG. 3 indicates, the work function may be more effectively lowered by accumulating $LaAlO_3$ on the accumulated insulating (undoped) buffer layer (18) than directly accumulating $LaAlO_3$ on the conductive substrate (16). This suggests that the two-dimensional electron gas produced in the very small area between the insulator (18) and insulator interface (20) contributes to the lowered work function.

So far, the present invention has been described based on embodiments thereof. Those skilled in the art should understand that these embodiments are examples and provide many variants that combine the components and processes thereof in a different manner and that such variants are covered by the present invention. Below follows a description of these variants.

As described earlier, in order to supply electric charge to the interface between $LaAlO_3$ and $SrTiO_3$, the electron-emitting source 1 in FIG. 1 includes the buffer layer 10 composed of two layers: the first layer 16 and the second layer 18. However, the present invention is not limited to this embodiment. The ohmic electrode may be formed by wire-bonding aluminum or a similar metal, in place of the first layer 16, onto the interface of $LaAlO_3$ and $SrTiO_3$ or by connecting aluminum wiring to the interface.

Figure 4:
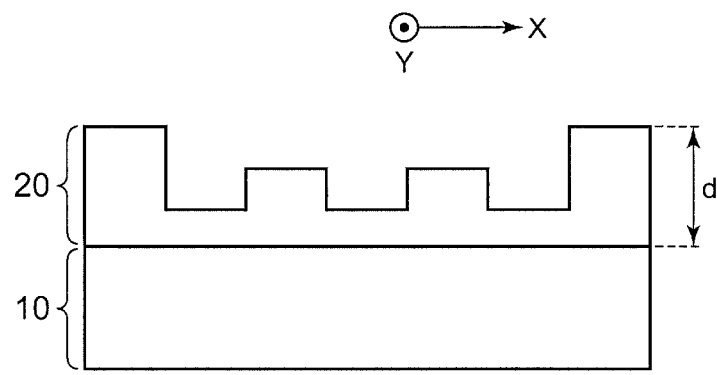
FIG. 4 shows a section view of a variant example of the electron-emitting source in FIG. 1.

FIG. 4 is a section view to show an example of a variant of the electron-emitting source la in FIG. 1. The electron-emitting source la in FIG. 4 is configured to allow the thickness d of the thin film layer 20 to change in planar directions (at least one of the X- and Y-axis directions). As FIGS. 2 and 3 indicate, the work function may be controlled according to the thickness of the thin film layer 20. For this reason, the structure in FIG. 4 can allow the work function to have an in-plane distribution and control electron emissions according to the distribution.

Second Embodiment

A second embodiment of the present invention relates to substrates for thin-film growth. The substrate for thin-film growth 1 is structured in the same manner as in FIG. 1. The structure in FIG. 1 can provide for a very flat surface having a certain size that is also very chemically stable. For these reasons, the substrate of the embodiment is suitable as a substrate for thin-film growth.

Further, the substrate for thin-film growth 1 exhibits a low work function that may be controlled according to the thickness of the $LaAlO_3$ thin film layer. For this reason, it can cause a specific reaction by giving the optimal work function appropriate for the material (mainly gas) to be accumulated based on the CVD method; it can thus enhance the growth. Specifically, it is effective when, for example, the material is accumulated based on the molecule reaction caused by electron supply.

The materials and sizes indicated in the descriptions of the embodiments are examples. Those in the art should understand that the materials and sizes may be changed as required.

While the preferred embodiments of the present invention have been described using specific terms, such description is for illustrative purposes only, and it is to be understood that changes and variations may be made without departing from the spirit or scope of the appended claims.

What is claimed is:

1. An electron-emitting source comprising:
   a SrTiO3 buffer layer including a laminate of Sr2+O2- and Ti4+O24-; and
   a LaAlO3 thin film layer including La3+O2- and Al3+ O24- layers alternately laminated in order on the SrTiO3 buffer layer, wherein
   a topmost surface of the SrTiO3 buffer layer which contacts with the LaAlO3 thin film layer is terminated with Ti4+O24-,
   wherein the SrTiO3 buffer layer comprises:
   a first layer of conductive SrTiO3; and
   a second layer of insulating, undoped SrTiO3 formed on the first layer.

2. The electron-emitting source according to claim 1, wherein the first layer of $SrTiO_3$ is doped with Nb or La, or wherein oxygen defects are incorporated on the first layer of $SrTiO_3$.

3. The electron-emitting source according to claim 1, wherein the thickness of the second layer is about 20 unit cells.

4. The electron-emitting source according to claim 1, further comprising an electrode connected to the interface between the $SrTiO_3$ buffer layer and the $LaAlO_3$ thin film layer.

5. The electron-emitting source according to claim 1, wherein the thickness of the $LaAlO_3$ thin film layer is between four (4) and twenty (20) unit cells inclusive.

6. The electron-emitting source according to claim 1, wherein the thickness of the $LaAlO_3$ thin film layer varies in the planar directions.

7. A substrate for thin-film growth comprising:
   a $SrTiO_3$ buffer layer including a laminate of $Sr^{2+}O^{2-}$ and $Ti^{4+}O_2^{4-}$; and
   a $LaAlO_3$ thin film layer including $La^{3+}O^{2-}$ and $Al^{3+}O_2^{4-}$ layers alternately laminated in order on the $SrTiO_3$ buffer layer,
   wherein a thin film layer is formed on the $LaAlO_3$ thin film layer via the CVD (chemical vapor deposition) method, and wherein
   a topmost surface of the $SrTiO_3$ buffer layer which contacts with the $LaAlO_3$ thin film layer is terminated with $Ti^{4+}O_2^{4-}$;
   wherein the SrTiO3 buffer layer comprises:
   a first layer of conductive SrTiO3; and
   a second layer of insulating, undoped SrTiO3 formed on the first layer.

* * * * *